United States Patent [19]

Menard

[11] Patent Number: 5,438,909
[45] Date of Patent: Aug. 8, 1995

[54] DEVICE FOR ENERGY TRANSMISSION FOR MECHANICAL CONTROL, IN PARTICULAR FOR THE CONTROL OF BRAKING PRESSURE IN A BRAKE

[75] Inventor: Christian Menard, Villennes s/Seine, France

[73] Assignee: Thomson-CSF, Puteaux, France

[21] Appl. No.: 214,677

[22] Filed: Mar. 21, 1994

Related U.S. Application Data

[63] Continuation of Ser. No. 21,086, Feb. 23, 1993, abandoned.

Foreign Application Priority Data

Mar. 10, 1992 [FR] France .................. 92 02843

[51] Int. Cl.⁶ ................. F15B 13/16; F16K 31/02
[52] U.S. Cl. ..................... 91/361; 91/459; 91/DIG. 4; 251/129.11; 137/625.65
[58] Field of Search ........... 60/459; 91/459, 461, 91/361, 363 R, 363 A, 61, DIG. 4, 382; 137/625.65; 251/129.04, 129.05, 129.11, 129.2; 92/5 R

[56] References Cited

U.S. PATENT DOCUMENTS

| | | | |
|---|---|---|---|
| 1,913,910 | 6/1933 | Altmayer | 91/362 |
| 2,106,474 | 1/1938 | Baughman | 91/362 |
| 4,142,489 | 3/1979 | Menard . | |
| 4,250,846 | 2/1981 | Menard . | |
| 4,313,414 | 2/1982 | Plateline . | |
| 4,352,345 | 10/1982 | Menard . | |
| 4,370,714 | 1/1983 | Rettich et al. | 91/361 X |
| 4,481,768 | 11/1984 | Goshorn et al. | 91/444 X |
| 4,748,957 | 6/1988 | Menard et al. . | |
| 4,766,921 | 8/1988 | Williams | 91/459 X |
| 4,789,001 | 12/1988 | Backe et al. | 251/129.11 X |
| 4,819,695 | 4/1989 | Kervagoret | 251/129.11 X |
| 4,895,344 | 1/1990 | Brand et al. . | |
| 4,951,468 | 8/1990 | Sasajima et al. | 91/459 X |
| 4,951,549 | 8/1990 | Olsen et al. | 91/362 X |
| 5,083,494 | 1/1992 | Dautremay | 91/361 |
| 5,174,546 | 12/1992 | Giordani | 251/129.11 X |

FOREIGN PATENT DOCUMENTS

| | | |
|---|---|---|
| 34076 | 8/1981 | European Pat. Off. . |
| 2314529 | 1/1977 | France . |
| 3728589 | 3/1989 | Germany . |
| 3939857 | 7/1990 | Germany . |

Primary Examiner—Edward K. Look
Assistant Examiner—Hoang Nguyen
Attorney, Agent, or Firm—Oblon, Spivak, McClelland, Maier & Neustadt

[57] ABSTRACT

The device according to the invention includes at least one rotational actuator fitted with a return spring and a connecting rod connected to the rotational actuator to transmit a linear movement to a mechanical part. The rotational actuator is moved by a rotational electromagnet whose angular position is controlled by a pulsed, periodic current. The device also includes apparatus for removal of the magnetizing energy stored in the electromagnet.

17 Claims, 6 Drawing Sheets

DEVICE FOR ENERGY TRANSMISSION FOR MECHANICAL CONTROL, IN PARTICULAR FOR THE CONTROL OF BRAKING PRESSURE IN A BRAKE

This application is a Continuation of application Ser. No. 08/021,086, filed on 01/23/93, now abandoned.

BACKGROUND OF THE INVENTION

The present invention concerns a device for energy transmission for mechanical control, in particular for the control of braking pressure in a brake.

It applies in particular to hydraulic actuators which require very short response times and low production costs. Such devices are used in braking systems, power-assisted steering or automatic guiding of mobile mechanisms or vehicles, for example.

There are several solutions for energy transmission for mechanical control, in particular based on pneumatic, hydraulic or electrical devices. The response times of pneumatic devices are too long for many applications and electrical devices require large amounts of electrical energy which is incompatible with on-board systems. Moreover, these two types of devices are relatively expensive. Control systems in modern vehicles, in particular applied to braking or automatic guiding for example, require ever shorter response times, corresponding for example to pass-bands of approximately 10Hz. Furthermore, the reduction in the overall cost of vehicles or mechanisms means that the cost of their component parts, including those of the said control systems, must be further reduced. At the present time, only hydraulic devices seem likely to be the most suitable for transmitting energy for on-board mechanical control in mobile equipment or vehicles, sufficiently cheaply and quickly, in order to meet the requirements of new technical and economic conditions.

Devices generally used in the field of hydraulic control make use of complete systems such as servomechanisms based on flow or pressure valves, for example. Hydraulic devices have characteristics and architectures forming a homogeneous set and whose function of control of flow or pressure is achieved by several stages consisting of slide valves and springs.

Normally, these servomechanisms have two stages. The first stage is a linear actuator with a blade fitted with a shaft or a bar moving by magnetization which results from the action of a current flowing in a solenoid located near the bar. The second stage is a hydraulic amplifier consisting of a slide valve and a return spring, for example. Mechanical inertia, resonances and time constants complicate the action and limit the speed of movement of the parts. It is nevertheless possible to improve the performance of these systems, in particular the performance relating to their response time or pass-band, but with the disadvantage of greater complexity, and therefore production costs, which might be acceptable in aeronautical applications but not in terrestrial vehicles, for example, which are mass produced and whose cost must be low.

One known solution capable of overcoming these disadvantages, in particular, by simplifying the servo-action thanks to limitation of resonance and instability phenomena, consists in replacing the previous actuator, of linear type, by a rotational actuator, transmitting, via a connecting rod for example, a translational movement to the hydraulic slide valve and in replacing the spring of the second stage with a return spring acting on the rotational actuator. Although this last solution, albeit less complex and cheaper, does improve performance by avoiding resonance phenomena in particular, the desired response times, of the order of 0.1 second for example, corresponding to pass-bands of approximately 10 Hz, have yet not been achieved in the tests carried out so far.

SUMMARY OF THE INVENTION

The object of the present invention is to overcome these disadvantages in particular by adding some measures for use in the command and control of the rotational actuator.

To this effect, the object of the invention is a device for energy transmission for mechanical control including at least one rotational actuator fitted with a return spring and means connected to the rotational actuator to transmit a linear movement to a mechanical part, wherein the rotational actuator is moved by a rotational electromagnet whose angular position is determined by the average value of a pulsed current and wherein it also includes the means of removal of magnetizing energy stored in the said electromagnet.

The main advantages of the invention are that devices can be obtained economically and with very short response times, which are compatible with automatic guiding and braking systems for example, and that these devices are small and easy to operate.

BRIEF DESCRIPTION OF THE DRAWINGS

Other characteristics and advantages of the present invention will become apparent on reading the following description with reference to the attached drawings which represent.

DESCRIPTION OF THE INVENTION

Figure 1A:
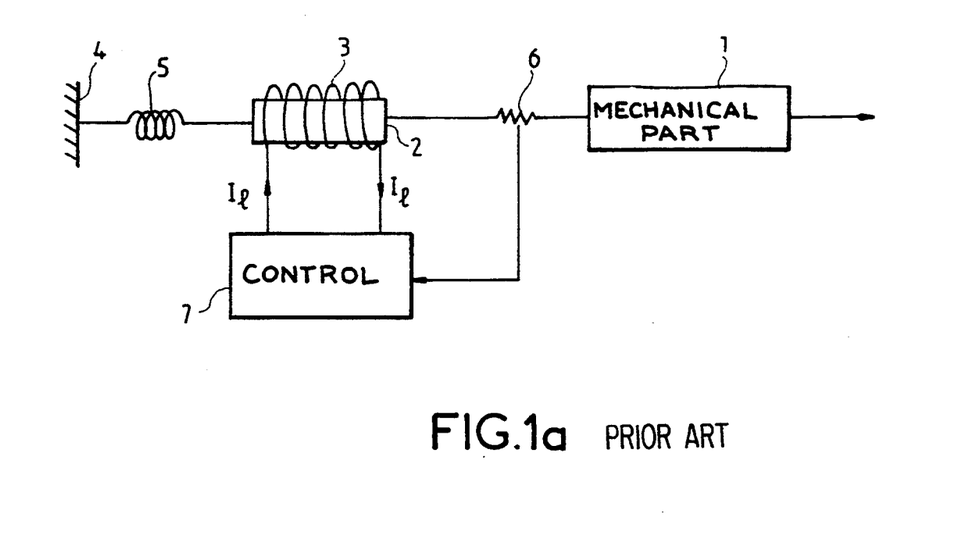
FIG. 1a: a block diagram of an energy transmission system for mechanical control, according to the prior art.

FIG. 1a represents a block diagram of an energy transmission system for a mechanical control according to the prior art. A mechanical part 1, a slide valve controlling several hydraulic circuits for example, has its position controlled by a linear actuator, an electromagnet, for example, made up of a magnetic bar 2 surrounded by a solenoid 3. The bar 2 is connected at one of its ends to a fixed support 4 via a spring 5. Its other end is connected to the mechanical part 1. Between the latter and the bar 2, a reading means 6 of the linear position of the mechanical part 1 is interposed. This reading means 6 may be for example a potentiometer connected to control means 7 of the electromagnet 2, 3, the potentiometer supplying a voltage or a current indicating the position of the mechanical part 1. Moreover, the control means 7, supplies a current $I_\lambda$, which determines the position of the bar 2. This positional information enables control of the position of the mechanical part 1. The function of the spring 5 is to return the bar 2 to its initial position.

Figure 1B:
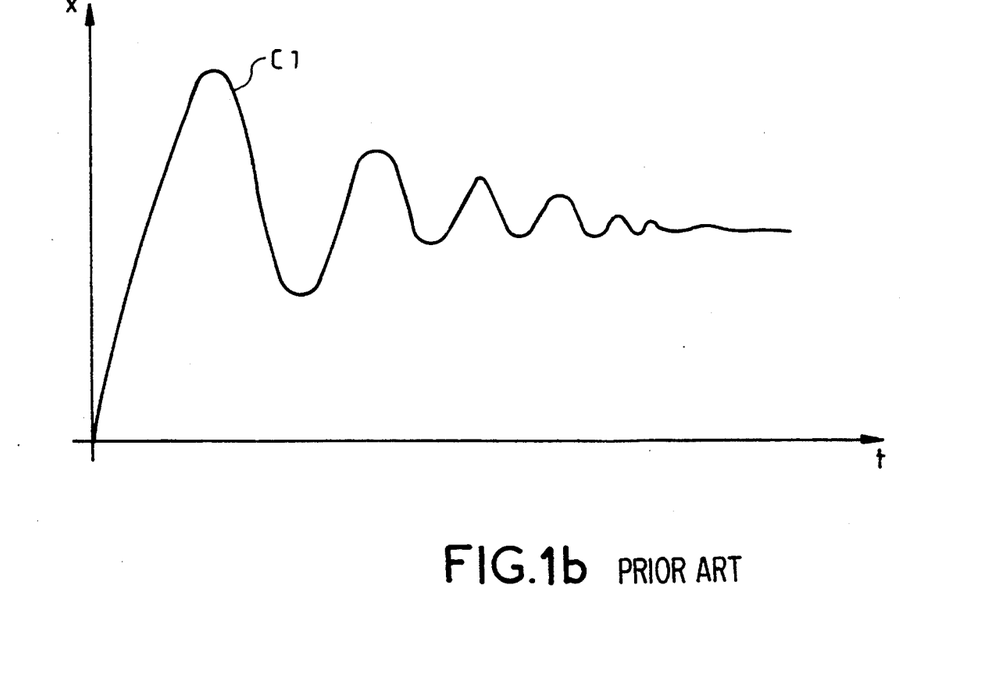
FIG. 1b: a response curve of the previous system following a variation of the position command.

The system thus described is in practice oscillatory, described by a second order equation. Therefore, each variation of the position command of the part via means 7 is likely to be accompanied by a transient oscillation as illustrated in curve C1 in figure 1b representing the response of the linear position x of the mechanical part 1 as a function of time, following a variation of the position command. In the case of the system in FIG. 1a, the values in particular of the return force of spring 5 and the weights of the bar 2 and the mechanical part 1, result in oscillations similar to those represented by curve C1, which delay the establishment of a stable position, i.e. they increase the response time of the system. Apart from this negative effect of these parasitic oscillations, the reading of the position of the mechanical part 1 is thus made more complicated by the oscillatory movement of the reading means 6 fixed to the mechanical part 1.

Figure 2A:
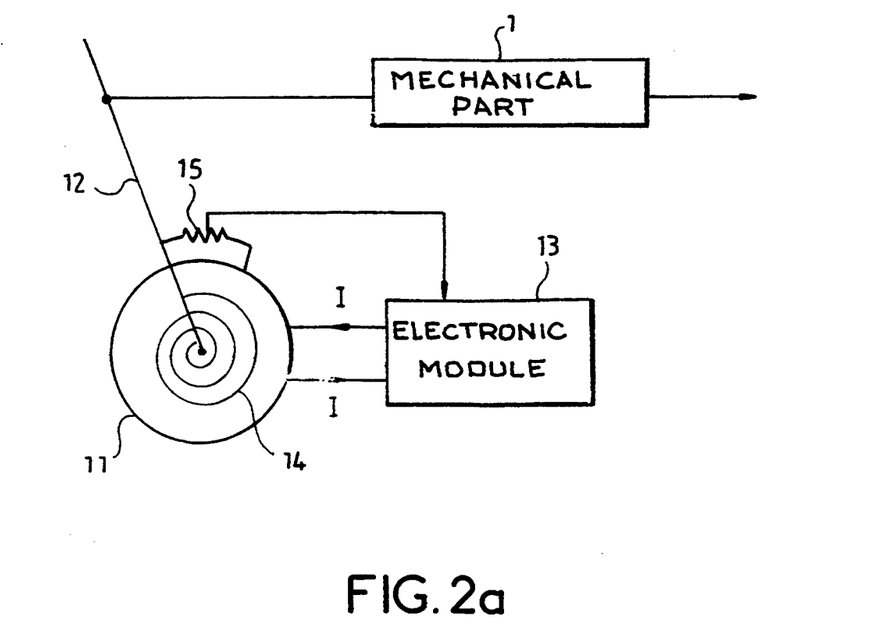
FIG. 2a: a block diagram of a possible device for energy transmission for mechanical control according to the invention.

One solution for removing the transient oscillatory movement consists in replacing the linear actuator, made up of the electromagnet 2, 3 by a rotational actuator 11 as shown in the block diagram in FIG. 2a. In the device presented in this figure, the mechanical part 1, a hydraulic valve for example, of which the movement is always linear, is connected to the rotational actuator 11 by means of a transmission 12. These means of transmission 12, a rod for example, connect the rotational movement of the rotational actuator 11 into a a linear movement of the mechanical part 1. The actuator 11 is moved by a rotational electromagnet to which it is mechanically fixed. The angular position of the latter, thus of the rotational actuator 11 is determined for example by a current I supplied by an electronic module 13. A concentric spring 14 exerts a couple opposite to that created by the current I of the rotational electromagnet and tends to return the rotational actuator 11 to its initial position. Means 15 of reading the angular position of the actuator 11 deliver an electric response indicating this position, a voltage or a current for example, to the electronic module 13 to enable the control of the angular position of the actuator 11.

Figure 2B:
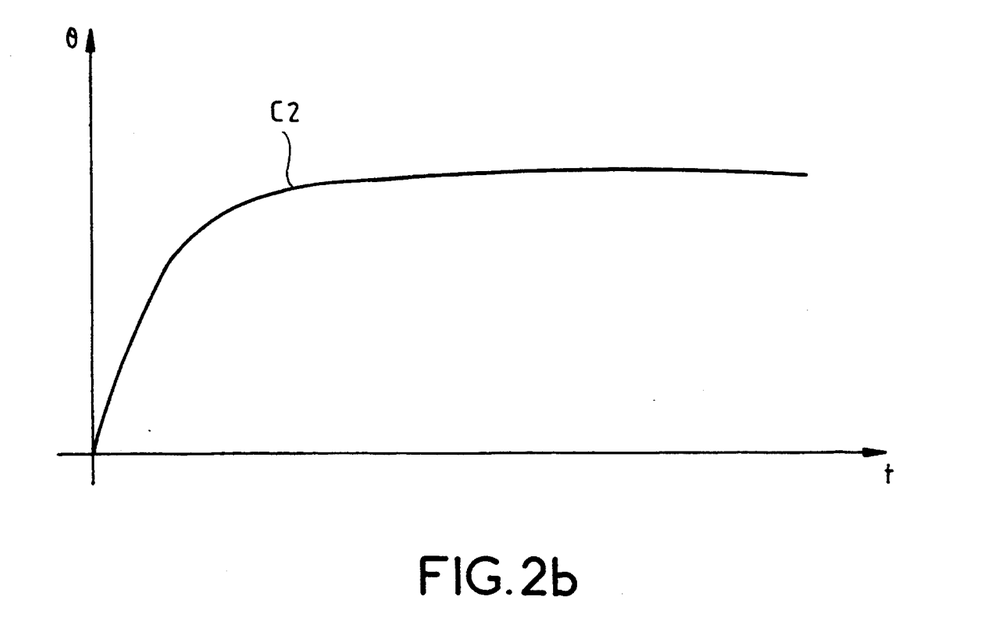
FIG. 2b: a response curve of the previous device following a variation of the position command.

The equations describing the angular movements of the actuator 11 are still second order. Nevertheless, the values in particular of the moment of inertia of the actuator itself, of the torques exerted by the spring 14 and by the mechanical part 1 can result in transient regimes whose curves lie below that of the critical regime for which there are no oscillations, as illustrated in FIG. 2b. We note that the curve C2, representing the response of the angular position Θ of the actuator 11 as a function of the time t following a variation of the angular position control, does not present any oscillations.

The variation of the angular position of the rotational actuator 11 is controlled by the variation of the average value of the current I supplying the electromagnet fixed to it. A simple method to vary the average value of the current I consists in choosing a pulsed and for example periodic current, whose peak value is substantially constant and to vary its periodicity.

Figure 3:
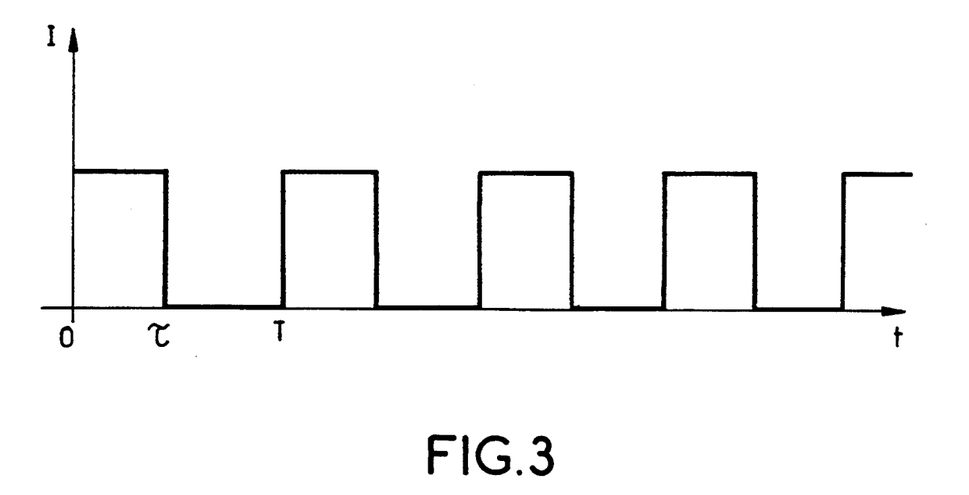
FIG. 3: a possible form of a control current of a rotational actuator used in the device according to the invention.

FIG. 3 illustrates a possible form of the current I as a function of time t, for supplying the electromagnet of the rotational actuator 11. This current I is pulsed and for example periodic. For each period T for example, it is non-zero and equal to I during a duration $\tau$, then zero for the rest of the period. The average value of the current I, denoted $I_A$, is given by:

$$I_A = \frac{\tau}{T} \cdot I \tag{1}$$

The frequency of the current I, hundreds of Hertz for example, is such that the time intervals where the current is null do not directly affect the position of the electromagnet of the actuator nor does it create instability because of the time constants of the latter which are very significantly greater than the time intervals where the current I is null. The ratio between the time $\tau$ during which the current I is established and the period T of this current cycle is known as the duty cycle or duty factor of the current I.

For relatively low frequencies of the current I, the response time of the angular position of the rotational actuator 11 is still too long, in that it still exceeds, for example, values of the order of 0.1 second necessary for some applications. The angular position of the rotational actuator 11 being determined by the duty cycle of a periodic current, one solution enabling the pass-band of the device to be increased, i.e. its response time to be reduced, is to increase the frequency of the current I. However, tests carried out previously have not indicated an increase in the pass-band with the increase in this frequency and the response times of the rotational actuator 11 stagnated at a value too high to enable the operation of the latter in control energy transmission devices suitable for modern applications such as automatic guiding or braking systems for example. The reason for this stagnation in the response time despite the increase in the frequency current I seems to be due to mechanical forces, in particular friction.

The observations and the experiments carried out by the Applicant have revealed the role of magnetizing energy stored in the electromagnet of the rotational actuator 11.

Figure 4A:
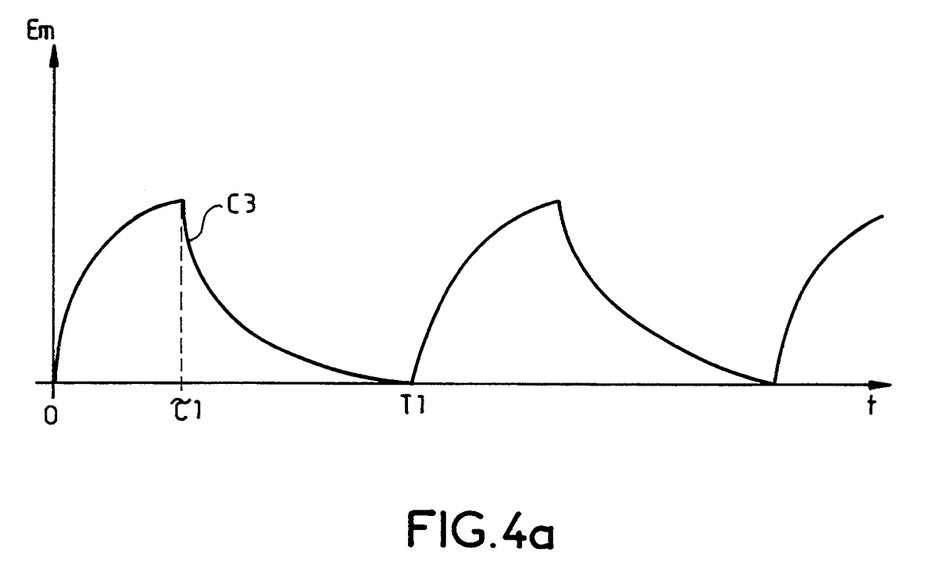
FIGS. 4a and 4b: forms of magnetizing energy stored in the electromagnet of the said actuator as a function of the frequency of its control current.
Figure 4B:
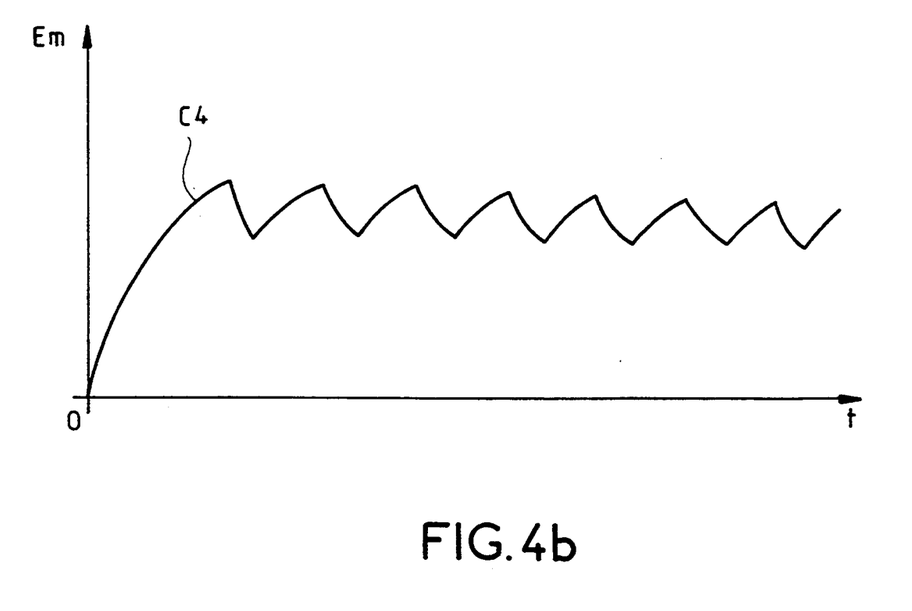

To this effect, FIGS. 4a and 4b illustrate the speed of this magnetizing energy Em as a function of time t. Curve C3 in FIG. 4a represents the magnetizing energy Em, where, during each period T1 of the cycle, the electromagnet is charged with magnetizing energy for a duration t1, i.e. when the current I is not null, and is discharged completely of this magnetizing energy for the remainder of the period. This complete discharge of the magnetizing energy is only possible if the period T1 is sufficiently long, i.e. if the frequency of the current I is sufficiently low. As soon as this frequency is increased in order to increase the pass-band of the device, the period of the current reduces to such a point that the magnetizing energy stored in the electromagnet of the rotational actuator 11 is no longer discharged completely as illustrated in curve C4 in FIG. 4b. In this figure, the electromagnet is charged up to a maximum value of energy but is no longer discharged completely afterwards, during the following periods. The magnetizing energy Em varies thus between a maximum value and a non-zero minimum value. Therefore, if the angular position of the rotational actuator 11 is defined by the average value of the current I, it is first of all a function of the average value of the magnetizing energy stored in the electromagnet of the actuator 11, this magnetizing energy being a function of the current I. When its frequency is such that the magnetizing energy Em is represented by curve C4, a variation of the average value of the current I, thus of its duty cycle, for varying the angular position of the actuator, generates a variation of the average current, not in a period of current as in the case of curve C3, but with a response time which is a function of the time constants of the internal circuits of the electromagnet. In this last case, the magnetizing energy Em is always represented by a curve of a form similar to curve C4, but establishes itself with a different average value. When the frequency of the current I is too high, the response time of the actuator to the variations of the duty cycle of the current I is not then a function of the frequency of the latter but of the time constants of internal circuits of the electromagnet, i.e. mainly of its coil. The self-inductance of this coil has a value which results in excessive response times for the electromagnet, and consequently for the actuator fixed to it.

With this problem highlighted, the device for energy transmission for mechanical control, according to the invention, retains the basic structure presented in the block diagram in FIG. 2a, using in particular the rotational actuator 11, and adds to it, inside the electronic module 13 for example, a circuit for demagnetizing the electromagnet of the actuator 11 to enable the removal of its magnetizing energy Em in one period of current cycle.

Figure 5:
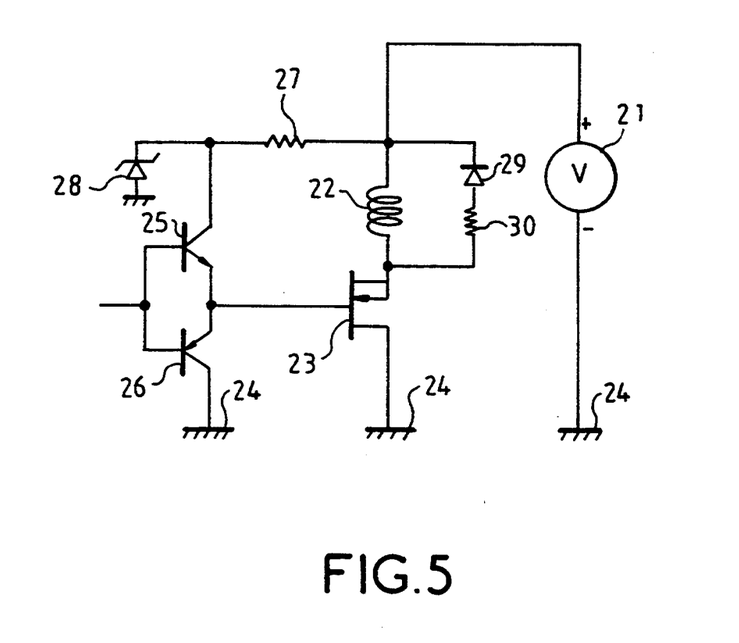
FIG. 5: a diagram of a possible demagnetization circuit of the internal circuits of the actuator.

FIG. 5 presents a possible example of a demagnetizing circuit of the electromagnet of the actuator 11. The current I is for example supplied by a voltage source 21, of 28 volts for example. This voltage source 21 is mainly charged by the coil 22 of the rotor of the electromagnet of the actuator 11 and by a transistor 23, a field effect transistor for example. Coil 22 is connected to the positive pole of the voltage source 21 and to the drain of the transistor 23. The negative pole of the voltage source 21 and the source of the transistor 23 are connected for example to a ground potential 24. The transistor is driven for example by two transistors 25, 26 mounted in "push-pull". The emitter of transistor 25 and the collector of transistor 26 are connected to the gate electrode of transistor 23, the collector of transistor 26 being connected to the ground potential 24. A resistance 27 connected between the positive pole of the voltage source 21 and the collector of transistor 25 limits the drive current in the transistors 25, 26. A peak limiting diode 28 limits the voltage on the terminals of these transistors. The bases of the transistors 25, 26 are connected to the same logical control signal. The presence of this signal allows a current to flow in transistor 23, via the other transistors 25, 26, and thus in the coil at a current of about 2 amperes for example. The absence of this signal blocks the transistor 23 and thus cancels the current in coil 22. This signal can be supplied by a analog circuit or a digital microprocessor circuit for example. When the current is cancelled in coil 22, a diode 29 and a resistance 30 demagnetize it. For this purpose, the resistance 30 is connected between the common point between the coil 22 and the drain of the transistor 23 and the cathode of the diode 29, the anode of the latter being connected to the other end of coil 22, itself connected to the positive pole of the voltage source 21. A filter, not shown, comprising essentially a capacitor and placed between the coil 22 and the voltage source 21, decouples the voltage source from the rest of the circuit, by avoiding in particular sudden variations in current on its output.

The magnetizing energy, to which the electromagnet of the rotational actuator is subjected, is thus cancelled quickly after the current in its coil has been interrupted. The frequency can then be increased to reduce the response time of the device according to the invention. A 10 Hz pass-band, or a response time of approximately 0.1 second, can then be easily achieved.

Figure 6:
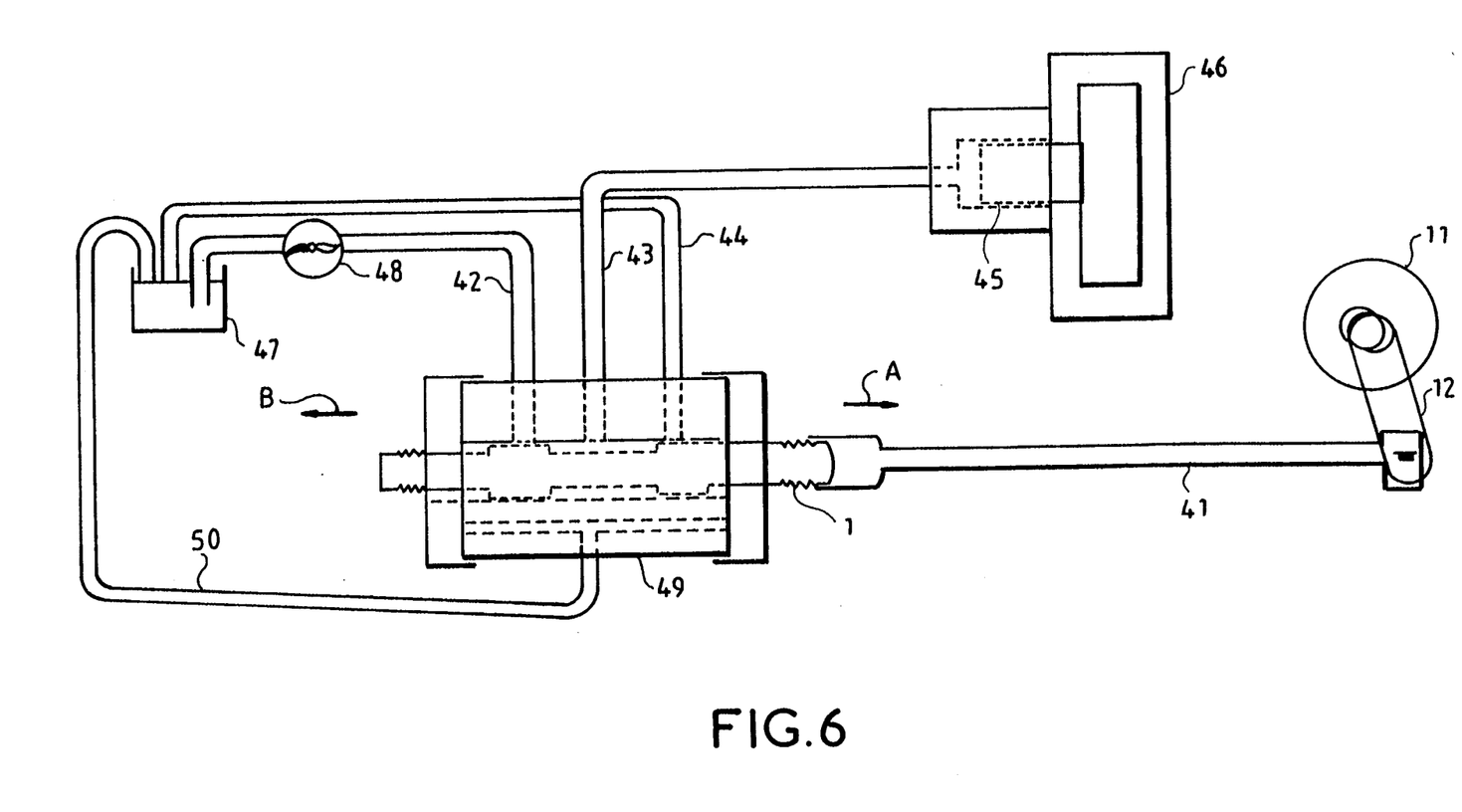
FIGS. 6 and 7: an example of a typical application of the device according to the invention, for the control of the braking pressure in a brake.
Figure 7:
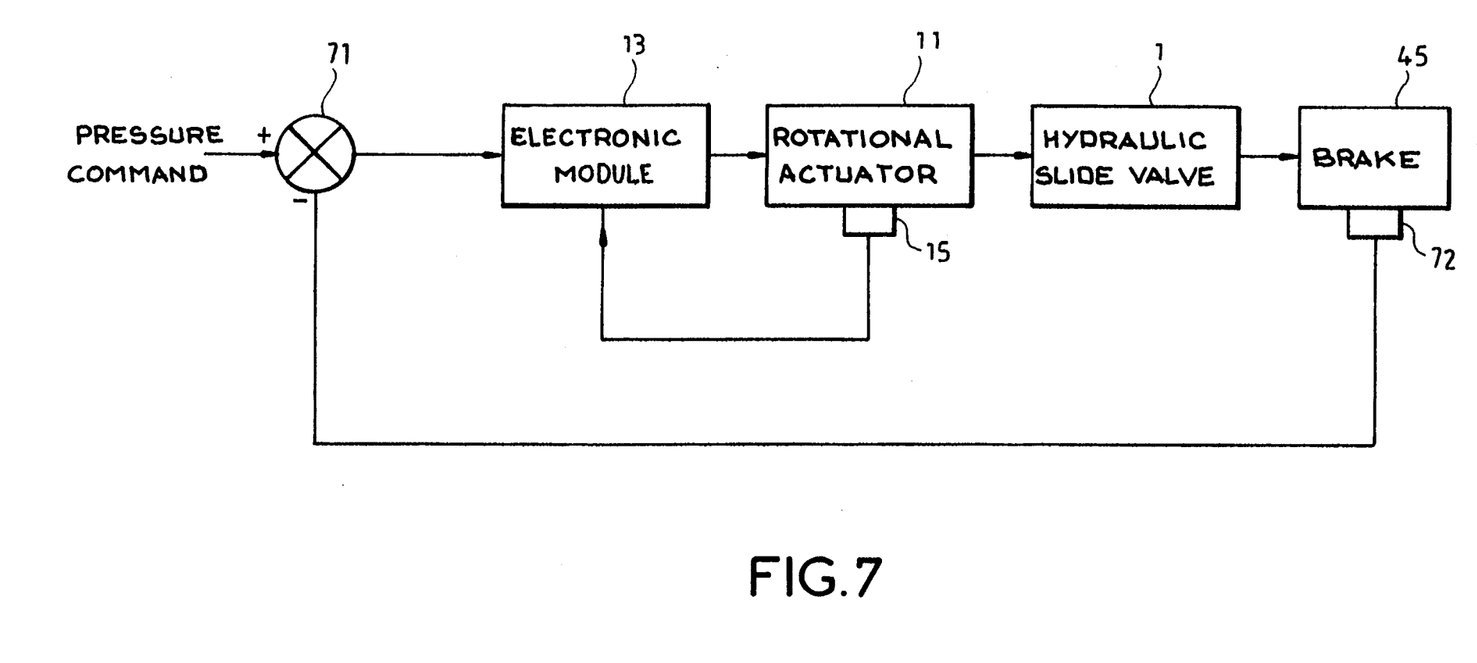

FIGS. 6 and 7 indicate, as an example, a possible application of the device for energy transmission for mechanical control, according to the invention, for the control of the braking pressure in a brake.

FIG. 6 presents a rotational actuator 11 fitted with a return spring, not shown, and transmitting a translational movement via a connecting rod 12 and a bar 41 to a hydraulic slide valve 1 contained in a body 49. This slide valve directs the circulation of oil or brake fluid through several hydraulic circuits 42, 43, 44. The hydraulic slide valve 1, by moving in the direction indicated by arrow A, enables the hydraulic outlet of a first circuit 42 to be connected to a second circuit 43, thereby connecting the source of hydraulic pressure to the hydraulic actuator, which is a piston 45 acting on the brake stirrup 46. When the slide valve moves in the direction indicated by arrow B, the brake actuator circuit 43 is connected to a third circuit 44. This latter circuit ensures the connecting of the load, the piston 45, with a reservoir 47. The first circuit 42 is connected to the reservoir 47 by means of a pump 48 regulated at a given pressure, 150 bars for example. The body 49 has at each of its ends a gaiter for the recovery of oil or fluid, which is then transmitted via a circuit 50 to the reservoir 47.

The electromagnet of the rotational actuator 11 can be controlled by a pulsed current at a frequency of about 500 Hz, for example.

The device in FIG. 6 offers the possibility of changing, between the rod 12 and hydraulic slide valve 1, the nature of the displacement by interposing the cams between the rod 12 and hydraulic slide valve 1. The rod 12 can, moreover, be extended beyond the translation axis of the hydraulic slide valve 1 represented by bar 41. This would allow direct and manual action on the position of the slide valve independently of the position control or in the event of a malfunction of this control. The position control is performed by the electronic module 13, not shown in FIG. 6.

FIG. 7 presents a block diagram of a possible type of position control suitable for the device in FIG. 6.

A pressure command is applied to the positive input of a differential unit 71. The latter transmits an error signal to the electronic module 13. An operator internal to this module converts this pressure error into a position error, thanks to a conversion table loaded for example into its memory. The electronic module supplies a current I to the electromagnet of the rotational actuator 11 calculated to obtain the desired angular position. The angular position sensor 15 of the rotational actuator 11 transmits a voltage or a current representative of the position of the actuator to the electronic module 13. The electronic module 13 performs a comparison with a command as a function of the error information supplied by the differential unit 71 and determines an error signal which becomes null when the position requested and that indicated by the position sensor 15 are identical. The angular position of the rotational actuator 11 corresponds to a linear position of the hydraulic slide valve 1. Depending on the position of the hydraulic slide valve 1, the pressure is applied to the actuator i.e. to the piston of the brake 45, or directed towards the reservoir 47. In the case where the pressure is sent to the brake, the pressure increases in the brake. A pressure sensor 72 connected to the negative input of the differential unit 71 indicates the real pressure obtained in the brake. When the pressure command and the real pressure in the brake match, the rotational actuator 11 positions itself in such a way that the hydraulic slide valve 1 is placed in a position which does not allow the supply pressure to be transmitted to the brake and, in this way, the braking pressure remains constant.

FIG. 7 shows two control loops, the first one regulating the angular position of the rotational actuator 11 and the second regulating the pressure in the brake. Depending on the performances required, it is possible not to control the position of its rotational actuator and to retain only the second control loop. Nevertheless, in all cases, thanks in particular to the demagnetizing circuit of the coil of the electromagnet of the rotational actuator, the performances of the device for energy transmission for mechanical control as represented in FIGS. 6 and 7 are very satisfactory as regards the pass-band and the response time obtained.

What is claimed is:

1. Device for energy transmission for mechanical control including at least one rotational actuator fitted with a return spring and means connected to the rotational actuator to transmit a linear movement to a mechanical part, wherein the rotational actuator is moved by a rotational electromagnet to an angular position determined by the average value of a pulsed current with the rotational electromagnet maintaining the rotational actuator at the angular position during application of the pulsed current, and wherein said device also includes means for removal of magnetizing energy stored in the said rotational electromagnet.

2. Device according to claim 1, wherein the current being periodic, the angular position of the rotational actuator is a function of the duty cycle of the current, equal to the ratio of the time where the current is established to its total period.

3. Device according to claim 1, wherein the means to transmit a linear movement to the mechanical part are made up of a connecting rod.

4. Device according to claim 1, including means for sensing the angular position of the rotational actuator, the sensing means delivering an electric signal representing the angular position to an electronic module which supplies the control current of the rotational electromagnet of the rotational actuator, in order to control the angular position of the rotational electromagnet.

5. Device according to claim 4, wherein the means for removal of the magnetizing energy are contained in the electronic module.

6. Device according to claim 1, wherein the means for removal of the magnetizing energy include at least one resistance and one diode connected in series, the resistance being connected to one end of the coil of the electromagnet of the rotational actuator and the cathode of the diode being connected to the other end of the coil.

7. Device according to claim 1, wherein the mechanical part is a hydraulic slide valve directing the flow of fluid through several hydraulic circuits.

8. Device according to claim 7, wherein the fluid flowing in the hydraulic circuits feeds a brake.

9. Device according to claim 8, wherein the control of the angular position of the rotational actuator is complemented by a control loop controlling the fluid pressure in the brake.

10. Device according to claim 9, wherein the control of the fluid pressure in the brake includes at least:
a differential unit, whose output is connected to the electronic module, a pressure command being applied to the input of the differential unit;
a pressure sensor connected to the negative input of the differential unit, indicating to the latter the real pressure obtained in the brake, the electronic module ensuring a comparison between the requested pressure as a function of the error information supplied at the output of the differential unit and the electrical value delivered by the sensing means indicating the angular position of the rotational actuator.

11. A control device comprising:
a rotational actuator, said rotational actuator including a rotational electromagnet for positioning said rotational actuator such that said rotational actuator is angularly displaced from an initial position to a desired position during application of a current, and wherein said rotational electromagnet maintains said rotational actuator at said desired position during application of the current;
a first circuit connected to said rotational actuator for supplying the current to said rotational electromagnet; and
a separate circuit for removing magnetizing energy from said rotational electromagnet.

12. The control device of claim 11, wherein said separate circuit includes at least one resistance and a diode connected in series.

13. The control device of claim 11, wherein said circuit for supplying current includes first and second transistors connected in push-pull, and a third transistor having a gate connected to said first and second transistors.

14. The control device of claim 11, wherein said circuit for supplying current includes means for supplying a pulsed current.

15. A device for providing a mechanical control comprising:
a rotational actuator, said rotational actuator including a rotational electromagnetic for positioning said rotational actuator such that said rotational actuator is angularly displaced from an initial position and maintained displaced from said initial position during application of a current;
a first circuit connected to said rotational actuator for supplying a current to said rotational electromagnet to move said rotational actuator to a desired position and maintain said rotational actuator at the desired position during application of said current; and
a second separate circuit for removing magnetizing energy from said rotational electromagnet, said second separate circuit connected to said rotational electromagnet such that upon interruption of a current supplied by said first circuit, magnetizing energy is removed by said second separate circuit, wherein a response time of the device is reduced by removal of said magnetizing energy by said second separate circuit.

16. The device of claim 15, wherein said first circuit includes means for supplying a pulsed current.

17. The device of claim 1, wherein said means for removal of magnetizing energy removes magnetizing energy between current impulses for decreasing the response time to a change of the average value of the pulsed current.

* * * * *